US011513356B2

(12) United States Patent
Leighton et al.

(10) Patent No.: US 11,513,356 B2
(45) Date of Patent: Nov. 29, 2022

(54) OPTICAL COMBINER APPARATUS

(71) Applicant: META PLATFORMS TECHNOLOGIES, LLC, Menlo Park, CA (US)

(72) Inventors: James Leighton, Canvey Island (GB); Iain Wellington, Chatham (GB); Adrian Stannard, St Leonards-on-Sea (GB); Philip A. Greenhalgh, Battle (GB); Nan Ma, Tonbridge (GB)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 69 days.

(21) Appl. No.: 16/845,018

(22) Filed: Apr. 9, 2020

(65) Prior Publication Data

US 2020/0233218 A1     Jul. 23, 2020

Related U.S. Application Data

(62) Division of application No. 15/206,111, filed on Jul. 8, 2016, now Pat. No. 10,649,209.

(51) Int. Cl.
  *G02B 27/01*       (2006.01)
  *G02B 27/14*       (2006.01)
  (Continued)

(52) U.S. Cl.
  CPC ......... *G02B 27/0172* (2013.01); *G02B 27/10* (2013.01); *G02B 27/147* (2013.01);
  (Continued)

(58) Field of Classification Search
  CPC .. G02B 27/017; G02B 27/0172; G02B 27/01; G02B 27/0101; G02B 2027/0178;
  (Continued)

(56) References Cited

U.S. PATENT DOCUMENTS 3,121,992 A    2/1964 Fritz et al.
4,220,400 A    9/1980 Vizenor
(Continued)

FOREIGN PATENT DOCUMENTS

CN    107272199 A    10/2017
EP    0785457 A2     7/1997
(Continued)

OTHER PUBLICATIONS

Aye T M, "Miniature Guided Light Array Sequential Scanning Display for Head Mounted Displays," Final Repod to US Army CECOM, May 15, 1998. Retrieved on-line from http://handle.dtic.mil/100.2/ADA350745, 35 pages.
(Continued)

*Primary Examiner* — Marin Pichler
(74) *Attorney, Agent, or Firm* — BakerHostetler

(57) ABSTRACT

Optical combiners are provided. The optical combiner may have a see through optically transparent substrate and a patterned region included in the optically transparent substrate and disposed along a wave propagation axis of the substrate. The patterned region may be partially optically reflective and partially optically transparent. The patterned region may comprise a plurality of optically transparent regions of the optically transparent substrate and a plurality of optically reflective regions inclined relative to the optical transparent substrate wave propagation axis. Augmented reality optical apparatus, such a head up display, may include the optical combiner.

33 Claims, 8 Drawing Sheets

(51) Int. Cl.
  *G02B 27/10* (2006.01)
  *F21V 8/00* (2006.01)
(52) U.S. Cl.
  CPC .... *G02B 6/0043* (2013.01); *G02B 2027/0118* (2013.01); *G02B 2027/0125* (2013.01); *G02B 2027/0178* (2013.01)
(58) Field of Classification Search
  CPC .... G02B 2027/0192; G02B 2027/0118; G02B 2027/012; G02B 2027/0121; G02B 2027/123; G02B 2027/0125; G02B 2027/0129; G02B 2027/013; G02B 2027/0132; G02B 2027/0134; G02B 2027/0136; G02B 6/0033; G02B 6/0035; G02B 6/0038; G02B 6/004; G02B 6/0041; G02B 6/0043; G02B 6/005; G02B 6/0055; G02B 6/0058
  USPC .................................................. 359/629–638
  See application file for complete search history.

(56) References Cited

U.S. PATENT DOCUMENTS

| | | |
|---|---|---|
| 4,232,943 A | 11/1980 | Rogers |
| 4,545,646 A | 10/1985 | Chern et al. |
| 4,767,186 A | 8/1988 | Bradley, Jr. et al. |
| 4,968,117 A | 11/1990 | Chern et al. |
| 5,050,946 A | 9/1991 | Hathaway et al. |
| 5,076,664 A | 12/1991 | Migozzi |
| 5,202,950 A | 4/1993 | Arego et al. |
| 5,253,637 A | 10/1993 | Maiden |
| 5,535,025 A | 7/1996 | Hegg |
| 5,848,119 A | 12/1998 | Miyake et al. |
| 5,886,822 A | 3/1999 | Spitzer |
| 5,896,438 A | 4/1999 | Miyake et al. |
| 5,959,726 A | 9/1999 | Riley et al. |
| 5,991,085 A | 11/1999 | Rallison et al. |
| 6,057,966 A | 5/2000 | Carroll et al. |
| 6,157,291 A | 12/2000 | Kuenster et al. |
| 6,204,974 B1 | 3/2001 | Spitzer |
| 6,222,677 B1 | 4/2001 | Budd et al. |
| 6,236,511 B1 | 5/2001 | Brown |
| 6,262,019 B1 | 7/2001 | Keller et al. |
| 6,288,846 B1 | 9/2001 | Stoner, Jr. |
| 6,353,503 B1 | 3/2002 | Spitzer et al. |
| 6,563,648 B2 | 5/2003 | Gleckman et al. |
| 6,577,311 B1 | 6/2003 | Crosby et al. |
| 6,607,286 B2 | 8/2003 | West et al. |
| 6,671,100 B1 | 12/2003 | McRuer |
| 6,714,174 B2 | 3/2004 | Suyama et al. |
| 6,829,095 B2 | 12/2004 | Amitai |
| 6,926,420 B2 | 8/2005 | Sung |
| 7,059,728 B2 | 6/2006 | Alasaarela |
| 7,079,318 B2 | 7/2006 | Shikama et al. |
| 7,209,097 B2 | 4/2007 | Suyama et al. |
| 7,336,244 B2 | 2/2008 | Suyama et al. |
| 7,418,202 B2 | 8/2008 | Biernath et al. |
| 7,446,943 B2 | 11/2008 | Takagi et al. |
| 7,506,987 B2 | 3/2009 | Nilsen |
| 7,513,674 B1 | 4/2009 | Donahue |
| 7,576,916 B2 | 8/2009 | Amitai |
| 7,639,208 B1 | 12/2009 | Ha et al. |
| 7,656,585 B1 | 2/2010 | Powell et al. |
| 7,686,497 B2 | 3/2010 | Kropac et al. |
| 7,688,347 B2 | 3/2010 | Dolgoff |
| 7,703,931 B2 | 4/2010 | Nilsen |
| 7,710,655 B2 | 5/2010 | Freeman et al. |
| 7,876,489 B2 | 1/2011 | Gandhi et al. |
| 7,936,519 B2 | 5/2011 | Mukawa et al. |
| 7,944,616 B2 | 5/2011 | Mukawa |
| 7,991,257 B1 | 8/2011 | Coleman |
| 8,384,999 B1 | 2/2013 | Crosby et al. |
| 8,964,292 B1 | 2/2015 | Marason et al. |
| 8,988,463 B2 | 3/2015 | Stone Perez et al. |
| 9,252,015 B2 | 2/2016 | Wu et al. |
| 9,720,232 B2 | 8/2017 | Hua et al. |
| 10,007,115 B2 | 6/2018 | Greenhalgh et al. |
| 10,191,993 B2 | 1/2019 | Ross et al. |
| 10,481,678 B2 | 11/2019 | Crispin |
| 10,488,666 B2 | 11/2019 | Leighton et al. |
| 10,623,722 B2 | 4/2020 | Markovsky et al. |
| 10,649,209 B2 | 5/2020 | Leighton et al. |
| 10,795,434 B2 | 10/2020 | Crispin |
| 10,962,786 B2 | 3/2021 | Leighton et al. |
| 2001/0021239 A1 | 9/2001 | Itoga |
| 2001/0033440 A1 | 10/2001 | Togino |
| 2002/0021461 A1 | 2/2002 | Ono et al. |
| 2002/0070904 A1 | 6/2002 | Okuyama |
| 2003/0169397 A1 | 9/2003 | Reichow |
| 2003/0184868 A1 | 10/2003 | Geist |
| 2005/0094292 A1 | 5/2005 | Cahall |
| 2006/0119794 A1 | 6/2006 | Hillis et al. |
| 2006/0132914 A1 | 6/2006 | Weiss et al. |
| 2007/0008624 A1 | 1/2007 | Hirayama |
| 2007/0177275 A1 | 8/2007 | McGuire, Jr. |
| 2009/0051879 A1 | 2/2009 | Vitale et al. |
| 2009/0167651 A1 | 7/2009 | Minano et al. |
| 2010/0103078 A1 | 4/2010 | Mukawa et al. |
| 2010/0149073 A1 | 6/2010 | Chaum |
| 2010/0278480 A1 | 11/2010 | Vasylyev |
| 2010/0290127 A1 | 11/2010 | Kessler et al. |
| 2010/0321409 A1 | 12/2010 | Komori et al. |
| 2011/0007277 A1 | 1/2011 | Solomon |
| 2011/0050655 A1 | 3/2011 | Mukawa |
| 2011/0083741 A1 | 4/2011 | Munro |
| 2011/0083742 A1 | 4/2011 | Munro |
| 2011/0155331 A1 | 6/2011 | Lopin |
| 2011/0157600 A1 | 6/2011 | Lyon |
| 2011/0213664 A1 | 9/2011 | Osterhout et al. |
| 2011/0221656 A1 | 9/2011 | Haddick et al. |
| 2011/0226332 A1 | 9/2011 | Ford et al. |
| 2011/0227813 A1 | 9/2011 | Haddick et al. |
| 2011/0255303 A1 | 10/2011 | Nichol et al. |
| 2011/0286222 A1 | 11/2011 | Coleman |
| 2012/0002294 A1 | 1/2012 | Dobschal |
| 2012/0002295 A1 | 1/2012 | Dobschal et al. |
| 2013/0147686 A1 | 6/2013 | Clavin |
| 2013/0235191 A1 | 9/2013 | Miao |
| 2013/0242392 A1 | 9/2013 | Amirparviz et al. |
| 2014/0153102 A1 | 6/2014 | Chang |
| 2015/0205126 A1 | 7/2015 | Schowengerdt |
| 2016/0109708 A1 | 4/2016 | Schowengerdt |
| 2016/0154244 A1 | 6/2016 | Border et al. |
| 2016/0270656 A1 | 9/2016 | Samec et al. |
| 2019/0250405 A1 | 8/2019 | Leighton et al. |
| 2020/0042082 A1 | 2/2020 | Crispin |
| 2020/0049998 A1 | 2/2020 | Leighton |
| 2020/0183152 A1 | 6/2020 | Stannard |
| 2020/0183174 A1 | 6/2020 | Noui et al. |
| 2020/0225400 A1 | 7/2020 | Stannard |
| 2020/0278553 A1 | 9/2020 | Leighton et al. |
| 2021/0055788 A1 | 2/2021 | Crispin |

FOREIGN PATENT DOCUMENTS

| | | |
|---|---|---|
| EP | 1798592 A2 | 6/2007 |
| EP | 1736812 B1 | 4/2010 |
| EP | 3355315 A1 | 8/2018 |
| RU | 2069835 C1 | 11/1996 |
| TW | 271580 B | 1/2007 |
| WO | 2002099509 A1 | 12/2002 |
| WO | 2007014371 A2 | 2/2007 |
| WO | 2007019138 A1 | 2/2007 |
| WO | 2007062098 A2 | 5/2007 |
| WO | 2008109420 A2 | 9/2008 |
| WO | 2008110942 A1 | 9/2008 |
| WO | 2010033859 A2 | 3/2010 |
| WO | 2010062481 A1 | 6/2010 |
| WO | 2010106248 A1 | 9/2010 |
| WO | 2010112393 A1 | 10/2010 |
| WO | 2010123934 A1 | 10/2010 |
| WO | 2011113071 A1 | 9/2011 |
| WO | 2011124897 A1 | 10/2011 |

(56) References Cited

FOREIGN PATENT DOCUMENTS

| WO | 2011130715 | A2 | 10/2011 |
|---|---|---|---|
| WO | 2017027139 | A1 | 2/2017 |
| WO | 2018009885 | A1 | 1/2018 |
| WO | 2020123561 | | 6/2020 |
| WO | 2020146683 | | 7/2020 |

OTHER PUBLICATIONS

Corresponding GB Patent Application GB 1200321.6 specification and drawings, filed Jan. 9, 2011, at UK Intellectual Property Office, to Cerr Limited, Inventors: Crosby, David Nicholas et al., 46 pages.
UK Intellectual Property Office, Combined Search and Examination Report under Sections 17 and 18(3) of UK Patents Act 1977, dated May 8, 2012, issued on corresponding GB Patent Application GB1200312.6,to Cerr Limited, Inventors: Crosby, David Nicholas et al., 3 pages.
International Search Report and Written Opinion dated Nov. 2, 2017 on International Patent Application PCTUS1741228, filed in Jul. 17, 2017 in the name of Daqri, LLC, 21 pages.
International Search Report and Written Opinion dated Feb. 21, 2020 issued on International Patent Application PCT/US2019/065551, filed Dec. 10, 2019, in the name of Daqri LLC, 18 pages.
International Filing Receipt Dec. 10, 2019, issued on International Patent Application PCT/US2019/065551, filed Dec. 10, 2018, in the name of Daqri LLC, 4 pages.
International Search Report dated Jan. 9, 2020, issued on International Patent Application PCT/US19/55198, filed Oct. 8, 2019 in the name of Daqri, LLC.
International Search Report and Written Opinion dated May 19, 2020 on International Patent Application PCT/US2020/012995, filed Jan. 9, 2020 in the name of Daqri, LLC, 40 pages.
Office Action dated Aug. 27, 2020 issued on U.S. Appl. No. 16/739,103, filed Jan. 9, 2020, 2 pages.
Notice of allowance and fee(s) due dated Apr. 22, 2021 issued on U.S. Appl. No. 16/214,142, filed Dec. 10, 2018, 17 pages.
Office Action dated Apr. 6, 2021 issued on U.S. Appl. No. 16/709,787, filed Dec. 10, 2019, 24 pages.
Office Action dated May 19, 2020 issued on U.S. Appl. No. 16/877,490, 1 page.
Notice of allowance and fee(s) due dated Feb. 2, 2021 issued on U.S. Appl. No. 16/658,078, filed Oct. 19, 2019, 57 pages.
Office Action dated Apr. 24, 2020, issued on U.S. Appl. No. 16/658,078, filed Oct. 19, 2019, 54 pages.
Office Action dated Feb. 19, 2021 issued on U.S. Appl. No. 17/168,140, filed Feb. 4, 2021, 4 pages.
Notice of allowance and fee(s) due dated Aug. 28, 2020, issued on U.S. Appl. No. 16/596,648, filed Oct. 8, 2019, 48 pages.
Office Action dated Feb. 3, 2020 issued on U.S. Appl. No. 16/596,648, filed Oct. 8, 2019, 36 pages.
U.S. Appl. No. 17/168,140, filed Feb. 4, 2021.
Co-Pending U.S. Appl. No. 14/825,148, filed Aug. 12, 2015, 68 Pages.
Co-Pending U.S. Appl. No. 16/214,142, filed Dec. 10, 2018, 163 Pages.
Final Office Action dated Aug. 8, 2019 for U.S. Appl. No. 15/893,599, filed Feb. 10, 2018, 24 Pages.
Final Office Action dated Aug. 31, 2016 for U.S. Appl. No. 14/825,148, filed Aug. 12, 2015, 14 Pages.
Final Office Action dated Jan. 31, 2019 for U.S. Appl. No. 15/893,599, filed Feb. 10, 2018, 30 Pages.
International Preliminary Report on Patentability for International Application No. PCT/US2017/041228, dated Jan. 17, 2019, 11 Pages.
International Search Report and Written Opinion for International Application No. PCT/US2016/041588, dated Oct. 24, 2016, 32 Pages.
Non-Final Office Action dated May 3, 2012 for U.S. Appl. No. 13/345,769, filed Jan. 9, 2012, 18 Pages.
Non-Final Office Action dated Aug. 10, 2017 for U.S. Appl. No. 14/825,148, filed Aug. 12, 2015, 36 Pages.
Non-Final Office Action dated May 17, 2016 for U.S. Appl. No. 14/825,148, filed Aug. 12, 2015, 16 Pages.

OPTICAL COMBINER APPARATUS

CROSS-REFERENCE TO RELATED APPLICATIONS

This application is a divisional of U.S. Non-Provisional patent application Ser. No. 15/206,111, filed Jul. 8 2016, entitled "Optical Combiner Apparatus" in the name of DAQRI LLC, the entire disclosure of which is incorporated herein by reference as if fully set forth herein.

TECHNICAL FIELD

Embodiments relate to optical combiner apparatus and components thereof. More particularly but not exclusively, embodiments relate to augmented reality image combiners. Additionally, some embodiments relate to head mounted displays including optical combiners.

BACKGROUND

An optical see through combiner is a fundamental component in an augmented reality display system. The optical combiner enables the real world and an artificially generated scene created by a computer and created by a projector to be optically superimposed.

There are a number of optical systems that have been proposed and adopted with one of the main requirements is to take the projection system away from the eye so it does not obscure the natural view of the world. However, high performance optical combiner systems are complex and difficult to fabricate.

There is a need to provide improved optical combiners that are easier to manufacture and have better performance than current optical systems.

SUMMARY

According to a first aspect, there is provided an optical combiner. The optical combiner may comprise an optically transparent substrate and a patterned region included in the optically transparent substrate and disposed along a wave propagation axis of the substrate. The patterned region may be partially optically reflective and partially optically transparent. The patterned region may comprise a plurality of optically transparent regions of the optically transparent substrate and a plurality of optically reflective regions inclined relative to the optical transparent substrate wave propagation axis.

By including in the optical substrate a patterned region which is partially optically reflective and partially optically transparent, improved optical combiners are provided that are easier to manufacture and have better performance.

According to another aspect, an augmented reality optical combiner is provided. The optical combiner may comprise a transparent optical waveguide substrate for receiving an optical image and viewing there through a distant real world scene and a plurality of reflective elements arranged within the transparent optical waveguide for reflecting the received optical image. The plurality of reflective elements may be arranged in such a way that, when the optical combiner is in use, the received optical image is reflected and superimposed on the real world scene view so as to allow viewing of the distant real world scene while simultaneously viewing the optical image superimposed on the real world scene.

According to yet another aspect, an augmented reality optical apparatus is provided. The augmented reality optical apparatus may comprise a head mounted display and at least one of the aforementioned optical combiners supported on the head mounted display.

According to yet other aspects, methods of combining optical rays are provided. In one aspect, a method of combining optical rays comprises propagating first optical image rays along a length of an optical transparent waveguide substrate towards a pattern region included in said optical transparent substrate; transmitting second optical image rays through a width of the optical waveguide substrate; and selectively reflecting out of said optical substrate said first optical image rays at different points along said substrate from reflective regions of said pattern region; said reflected first optical image rays superimposing on said second optical image rays transmitted out of said optical transparent substrate.

The first optical image rays may be computer generated rays. The second optical image rays may be from a distant real world scene. The pattern region may be a pattern region as set forth hereinbefore.

BRIEF DESCRIPTION OF THE DRAWINGS

In order that the present invention may be more readily understood, reference will now be made to the accompanying drawings, in which.

DETAILED DESCRIPTION OF PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Figure 1:
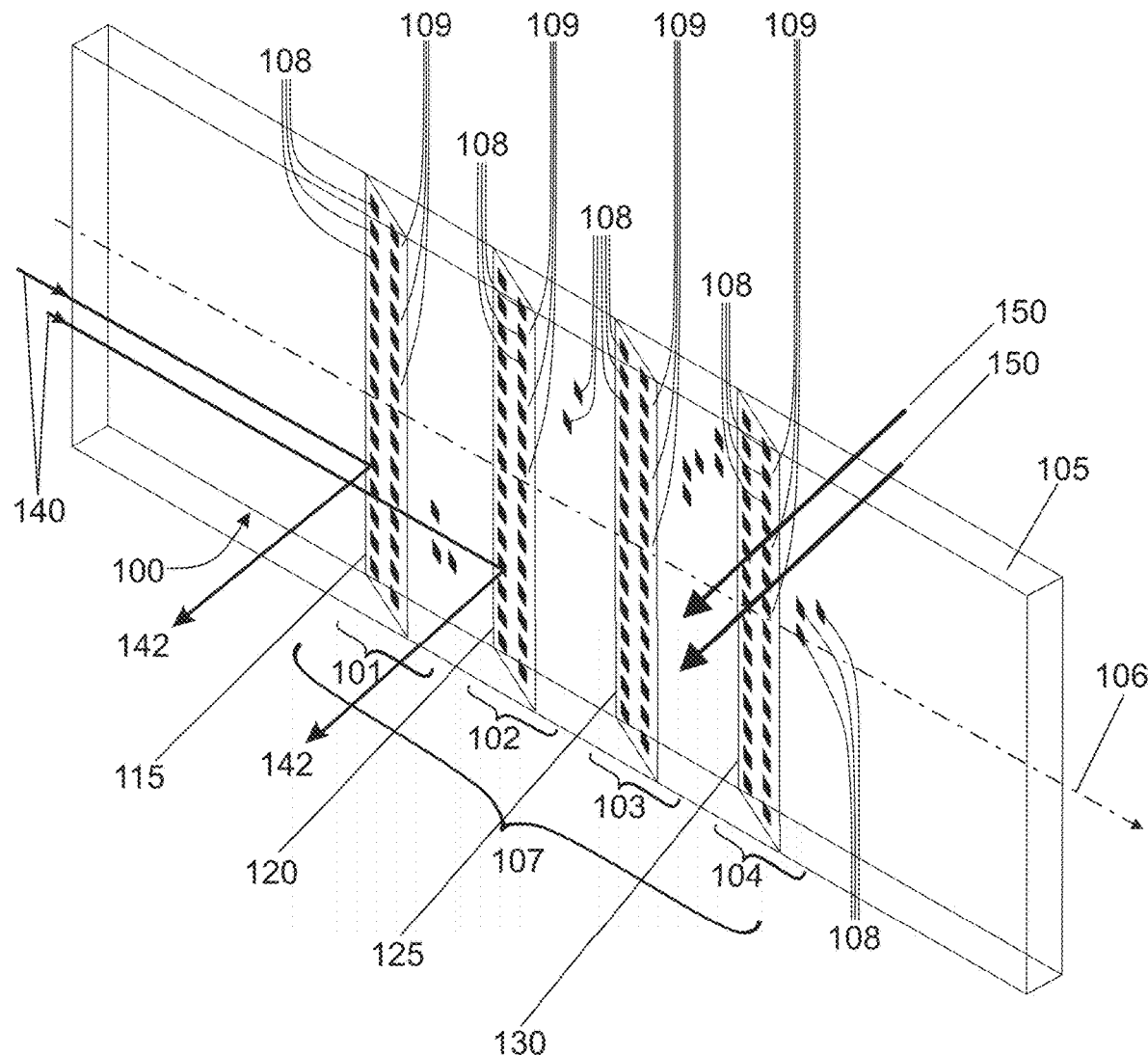
FIG. 1 is a front perspective view of an exemplary optical combiner in accordance with an embodiment.

Referring now to the accompanying drawings, FIG. 1 shows a front view of an exemplary optical combiner in accordance with an embodiment. Optical combiner 100 is formed from an optically transparent waveguide substrate 105. Substrate 105 has a wave propagation axis 106 extending along a length of the waveguide substrate. Optical image rays entering an optical receiving end or side of substrate 105 propagate through the substrate along the propagation axis 106.

Substrate 105 is a see-through substrate made from optical waveguide substrate material such as but not limited to glass or plastic. Optical rays 150 entering the substrate rear face pass through the substrate material and exit from the substrate front face. An observer located on one side of the substrate and looking through the front face of the substrate can see through the substrate material and observe objects, scenes etc. located on the other side of the substrate.

A patterned region 107 is included in a volume of the optically transparent substrate. Patterned region 107 is partially optically reflective and partially optically transparent. Patterned region 107 comprises a plurality of optically transparent regions 109 of optically transparent substrate 105 and a plurality of optically reflective regions 108 inclined relative to optical transparent substrate wave propagation axis 106. For sake of clarity, not all reflective regions are shown and not all shown reflective regions 108 and transparent regions 109 have been labeled with reference numerals. Optical image rays 140, which are captured in an end of the substrate, propagate along propagation axis 106, pass into patterned region 107, and are selectively reflected at different points along substrate 105 by inclined optical reflective regions 108. The reflected optical image rays 142 exit the front face of substrate 105.

For ease of illustration, rays 140 are shown only as straight through rays. There are countless other rays that bounce along the waveguide rather than passing straight through which are not shown (examples are given in FIGS. 2A, 2B & 6 of a bouncing ray). In some embodiments, patterned region 107 is a regular patterned region. In some other embodiments, pattern region 107 is an irregular patterned region or a combination of a regular pattern region and an irregular patterned region.

The patterned region can take various forms. In some embodiments, optically reflective regions 108 of pattern region 107 are a plurality of optically reflective elements distributed in optically transparent substrate 105, for example as shown in FIG. 1, and optically transparent regions 109 are regions of optical transparent substrate material 105 unoccupied by the plurality of reflective elements. In some other embodiments, pattern region 107 is a reverse design in which and optically transparent regions comprise a plurality of apertures or openings formed in reflective material layer or volume included in the substrate and optically reflective regions comprise the optically reflective material.

In the optical combiner of FIG. 1, optical reflective regions 108 comprise optical reflective elements which are reflective dots. For ease of explanation and visualization, in FIG. 1 and the other accompanying figures, reflective dots are shown enlarged and not to scale. Furthermore, not all reflective dots are shown. In practice, there are for example typically thousands of small reflective dots in the substrate and the dots are small enough that they cannot easily be seen by the human eye so that they do not substantially disrupt the see through performance of the optical combiner. In some embodiments, the optical reflective elements may be other types of discrete reflective elements such as reflective symbols, characters or the like rather than reflective dots.

In some embodiments, each of at least some of the reflective dots or other elements are fully reflective. In some other embodiments, each of at least some of the reflective dots or other reflective elements is partially reflective. For example, at least some of the reflective dots each have reflectivities between 5-100%. In some embodiments, the reflectivites of at least some of the reflective elements are the same. In some embodiments, the reflectivities of at least some of the reflective elements are different.

Optical reflective dots are each made of a reflective material such as but not limited to a single reflective metal layer or multiple layers of reflective oxides or other materials. The reflective dot material may deposited by known deposition techniques. In some embodiments, injection forming with over-molded reflective layers and optical 3D printing, may be used to form the optical substrate including the pattern region. In the embodiment of FIG. 1, reflective dots are distributed in a plurality of distinct planes 115, 120, 125, 130 spaced apart along a length of substrate. Each plane 115, 120, 125, 130, extends between top and bottom sides of substrate 105 and is inclined relative to propagation axis 106 as shown in FIG. 1. Reflective dots in each plane have a regular pattern and shape such as the rectangular matrix of square dots illustrated in FIG. 1. However, in other embodiments, the pattern of reflective dots in one or more of the planes can have other regular shaped matrixes or patterns, or can have an irregular pattern. Furthermore, as will be explained in more detail below, the shape, size, tilt, and/or spacing of each reflective dot, or at least some reflective dots, can be the same or can be different from one another.

Additionally, in some embodiments, reflective dots 108 are distributed in a volume section of the substrate that extends beyond each distinct plane 115, 120, 125, 130. By way of example, FIG. 1 illustrates reflective dots 108 are distributed in the distinct planes 115, 120, 125, 130 and also occupy intermediate regions of the substrate between the planes. In some embodiments of the optical combiner, reflective dots 108 are not distributed in distinct planes but rather are distributed throughout distinct volume sections spaced apart along a length of the waveguide substrate.

In any event, irrespective of how reflective elements are exactly distributed in the different embodiments, the reflective elements can form groups that are spaced along a length of substrate 105. For example, in FIG. 1, a first group 101 of reflective dots is arranged for partially reflecting optical image rays propagating along a length of substrate 105. Reflective elements of subsequent groups 102, 103, 104 spaced apart further along the wave guide are arranged for reflecting optical image rays unreflected by the first group of reflective elements.

Each group of reflective dots distributed about a distinct plane and/or a distinct volume section together with optical transparent substrate gaps therebetween collectively operate as a partially reflective individual reflector. FIG. 1 illustrates four such individual reflectors. However, in other embodiments, the optical combiner may have any number of such reflectors ranging from a single reflector to many many reflectors.

Optical combiner 100 is an extremely simple structure made up of reflective elements rather than reflectors which have a complex set of reflective layers coated over the entire area of each reflector.

Operation of the optical combiner as an optical image combiner is very simple, when the rays that form the image travel along the waveguide substrate some of them hit reflective dots of the first reflector and are re-directed towards the eye. The majority of the rays miss the dots as they only occupy a small area of the first reflector. If for example the dots occupy 5% of the overall area then overall reflectivity is about 5% too and 95% of the image energy passes through to the next reflector and so on. The reflective dots reflect optical rays 140 that have propagated straight through into the substrate but also the other rays 140 that arrive via a wide "bounce" and hit the reflective dots at a glancing angle (see for example the optical combiners shown in FIGS. 2A, 2B & 6 for examples of bouncing oncoming rays and reflections from reflective dots).

In some embodiments, the first reflector (group of dots 101) has a relatively low reflectivity (small area of dots) and subsequent ones have greater reflectivity (bigger area of dots) increasing reflectivity the further along the waveguide substrate. The dot area to optical transparent gap ratio is varied to obtain chosen reflectivity for each reflector.

Figure 9:
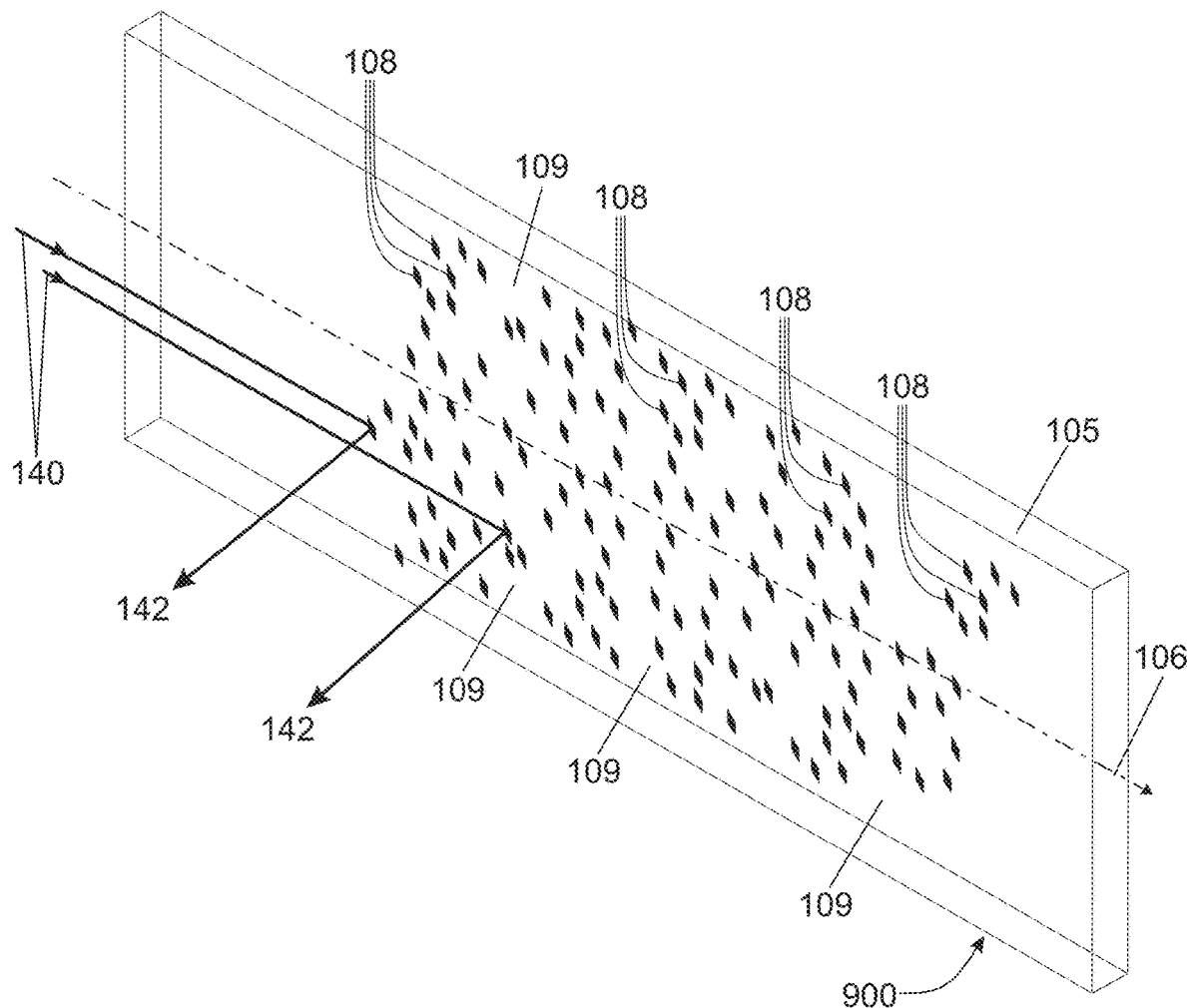
FIG. 9 is a front perspective view of an exemplary optical combiner in accordance with another embodiment.

In yet some other embodiments, all reflective dots 108 are distributed throughout a substrate volume extending along a length of the waveguide rather than occupy distinct planes and/or distinct volume sections. In such embodiments, reflective dots 108 and optically transparent gaps or regions therebetween effectively form one continuous partially reflective reflector extending through the substrate volume. FIG. 9 illustrates one such optical combiner 900 according to an embodiment. Reflective dots 108 are shown distributed to a volume of substrate 105. As already mentioned, for ease of illustration not all reflective dots are shown. Furthermore, the specific pattern of dots shown in FIG. 9 is merely an example dot pattern. The reflective dots 108 are still arranged so that the relatively reflectively increases from low to high further along the continuous reflector.

In yet some other embodiments of the optical combiner, the optical substrate is a non see-through substrate.

Figure 2A:
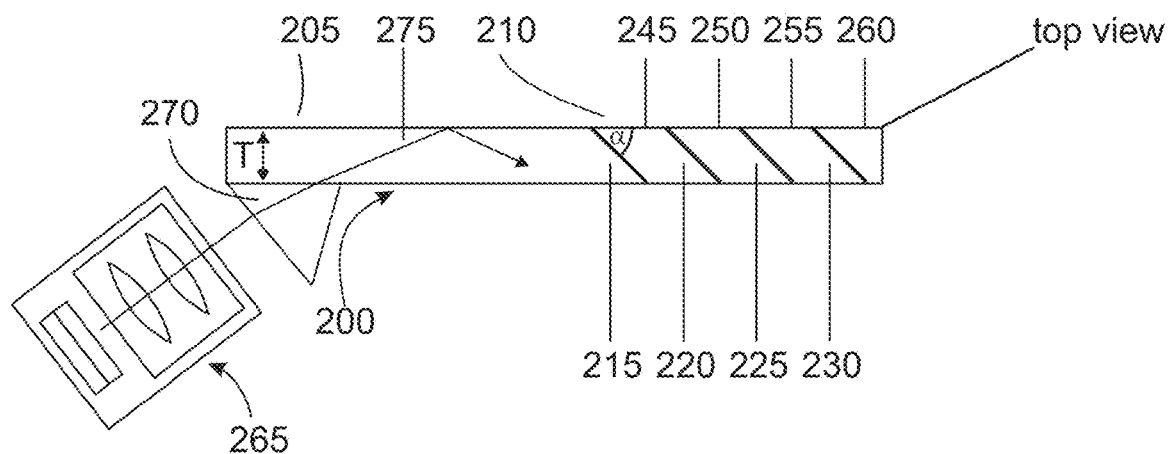
FIG. 2A is a top plan view of an optical combiner in accordance with an embodiment for use with an image projector.
Figure 2B:
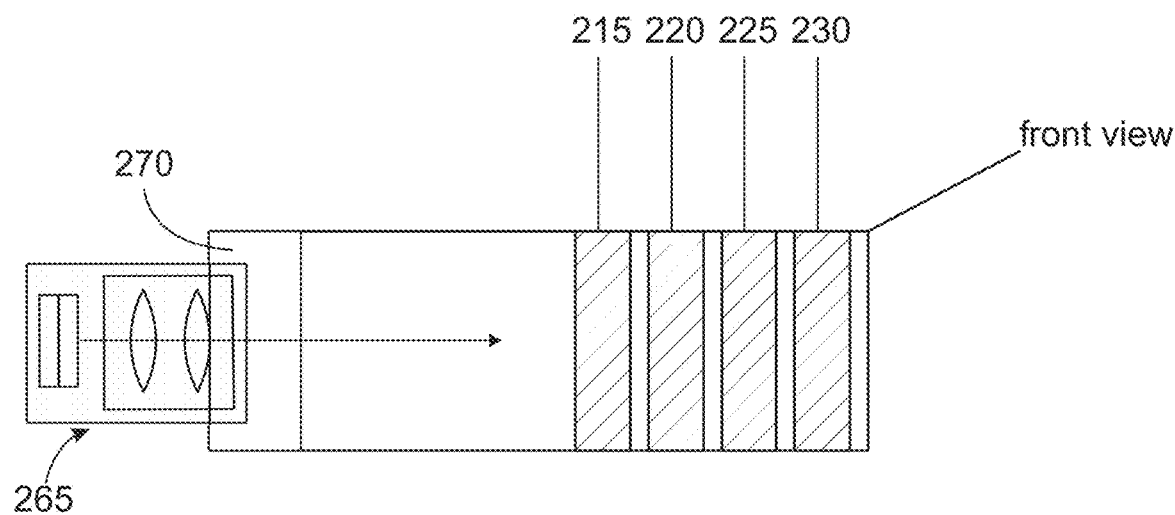
FIG. 2B is a front view of the optical combiner of FIG. 2A.

FIGS. 2A & 2B show the top & front views, respectively, of an optical combiner for use with an optical image generator according to an embodiment. Optical combiner 200 is a slab 205 (flat, parallel sides) of glass or plastic, or other optically transparent waveguide for near eye displays. In alternative embodiments, the waveguide is curved and the faces may not necessarily be parallel. Optical combiner 200 is similar to optical combiner 100 but for ease of fabrication each partially reflective reflector is a sparse aperture reflective surface made up of a surface pattern of the reflective dots or other types of reflective elements. There is an array of four such reflectors 215, 220, 225, 230 shown in FIGS. 2A & 2B but optical combiner 200 can have any number and typically 3 and 6. Reflector 215 has the lowest reflectivity in the array, reflector 220 has the next highest reflectivity, reflector 225 the next highest reflectivity and reflector 240 the highest reflectivity. By way of example, in some embodiments, first reflector 215 has a reflectivity of about 5-7%, second reflector 220 has a reflectivity of about 10%, third reflector 225 has a reflectivity of 20% and fourth reflector 230 with a reflectivity of about 80%.

Sparse aperture surface reflectors 215-230 comprise a plurality of reflective dots (such as dots 108), or other reflective elements, that are formed on a surface and can have many different configurations. In some embodiments, the reflective dots or other elements are arbitrary shapes and are arranged in a matrix on the surface in randomized positions. Reflective dots may be positioned about the surface in a deterministic manner or according to a random function.

In FIGS. 2A & 2B the optical source for generating optical image rays 140 is an image projector 265. A simplified situation is depicted in FIGS. 2A & 2B showing how a single ray 275 originating from the projector 265 is optically coupled into the waveguide substrate 205 using a prism 270. However, other optical coupling methods are possible including direct injection into the end of the waveguide, such as shown in FIG. 1 as rays 140. In other embodiments, other optical generators may be used instead of, or in addition to, projector 265.

Figure 3A:
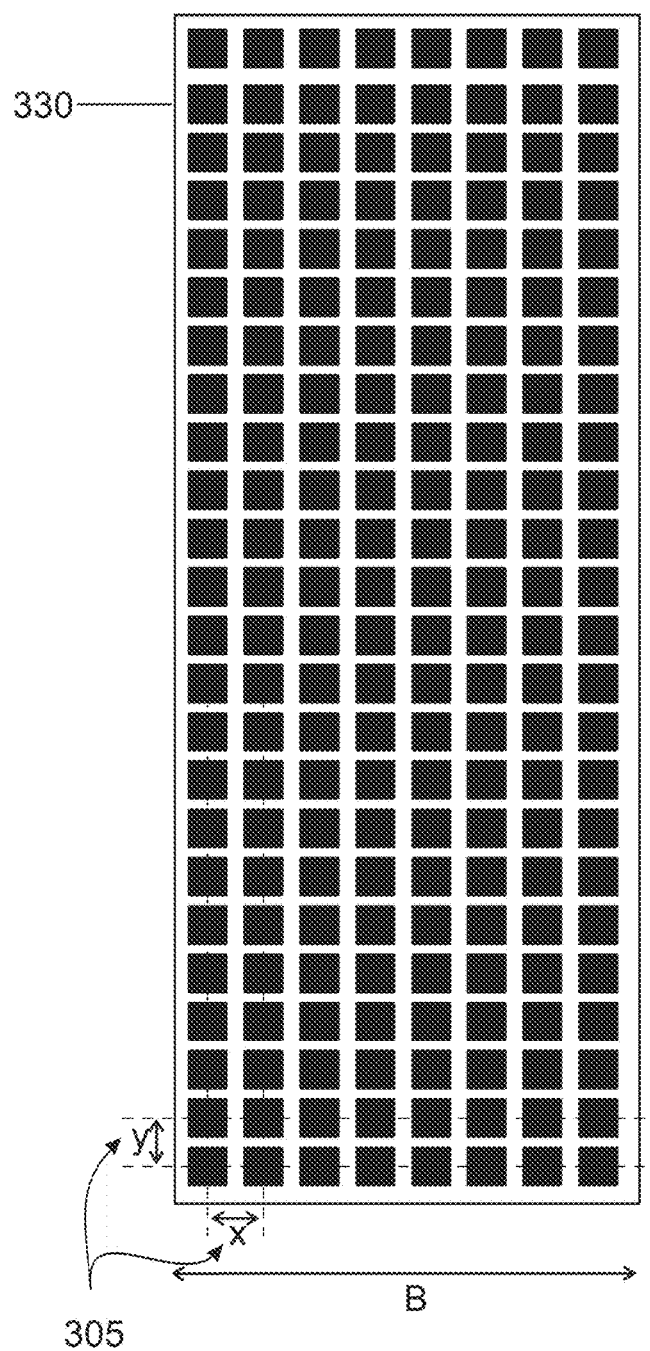
FIG. 3A is a front view of a sparse aperture reflector in accordance with an embodiment.
Figure 3B:
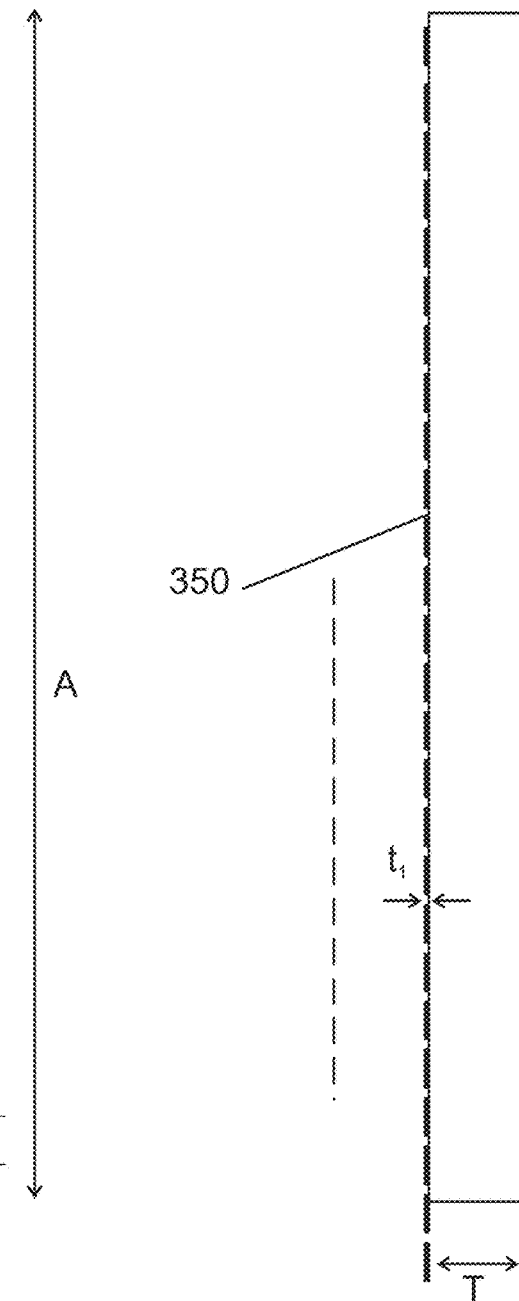
FIG. 3B is a side view of the sparse aperture reflector of FIG. 3A.

One such sparse aperture reflector surface is shown in more detail in FIGS. 3A & 3B, which illustrate a plan view and side view, respectively, of a sparse aperture reflector system according to one embodiment (for use as one or more of the reflectors 215-230 in the optical combiner of FIGS. 2A & 2B). For ease of fabrication, sparse aperture reflector system 330 has a simple matrix 350 of reflective dots 180 or other elements on a regular XY pitch 305. In FIGS. 3A & 3B, reflective matrix 350 is carried on a separate optically transparent substrate which when assembled with the other reflectors forms part of the optical waveguide substrate 205. In some other embodiments, reflective matrix 350 is formed directly on a surface of an intermediate region of the waveguide substrate 205 (see for example intermediate regions of 245-260 of FIGS. 2A & 2B). The height A of sparse aperture reflector surface 330 is typically but not limited to 35-50 mm but will vary depending on the specific optical combiner characteristics desired. The width B of sparse aperture reflector surface is determined according to the number of reflectors required in the optical combiner and according to the thickness of the optical wave guide substrate. The thickness T1 of the reflective dots or other elements will vary but is typically but not limited to 0.1-1 micrometers (um).

Figures 4A, 4B:
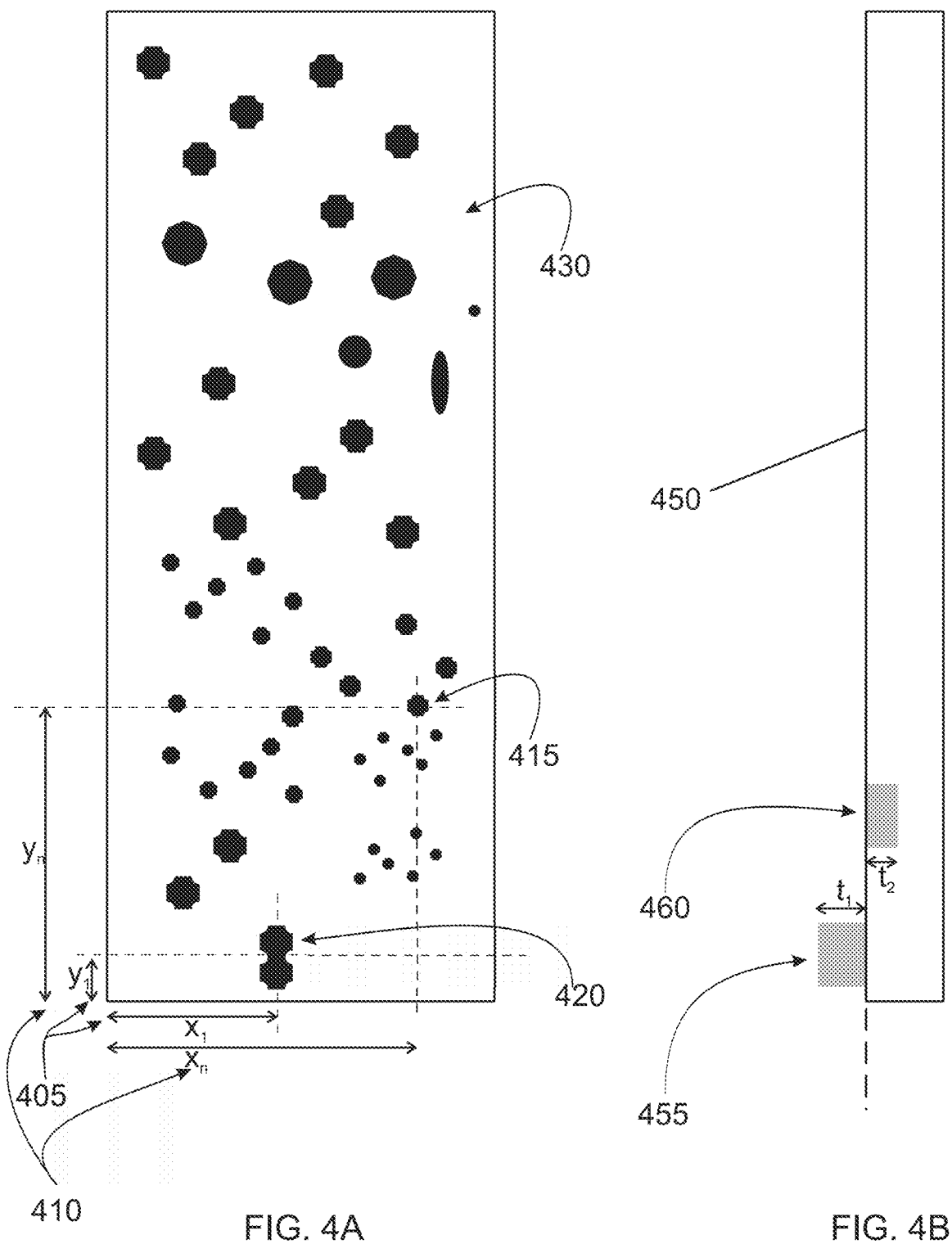
FIG. 4A is a front view of a sparse aperture reflector in accordance with another embodiment.
FIG. 4B is a side view of the sparse aperture reflector of FIG. 4A.

FIGS. 4A & 4B illustrate a plan view and side view, respectively, of a sparse aperture reflector system according to another embodiment (for use as one or more of the reflectors 215-230 in the optical combiner of FIGS. 2A & 2B). Sparse aperture reflector system 400 differs from the system 300 in the arrangement and parameters of the reflective dots or other elements. As shown in FIGS. 4A &4B, the reflective dots patterned on the front face of the reflector system have some different shapes. The dot shapes are regular shapes and/or random shapes. By way of example, in FIGS. 4A & 4B, first dot 420 has an arbitrary shape and second dot 415 has an arbitrary shape. Reflective dots have different separation distances. The reflecting dot thickness may also vary for different reflective dots. Optical combiner performance and imaging can be controlled and improved by optimization of various reflector parameters including but not limited to the following: shape of the dots (regular or random shapes), minimum dimension of a dot feature, maximum dimension of a dot feature, degree of randomization over surface, thickness of dot reflecting material, minimum separation between dots, maximum separation between dots and fraction of area occupied by dots. In some embodiments, at least some reflective dots or other elements have a fully or substantially reflective front side and fully or substantially absorbing rear side. As shown in FIGS. 4A & 4B, some reflective dots or elements include a buried relief reflector 460 and a positive relief reflector 455.

Figure 10:
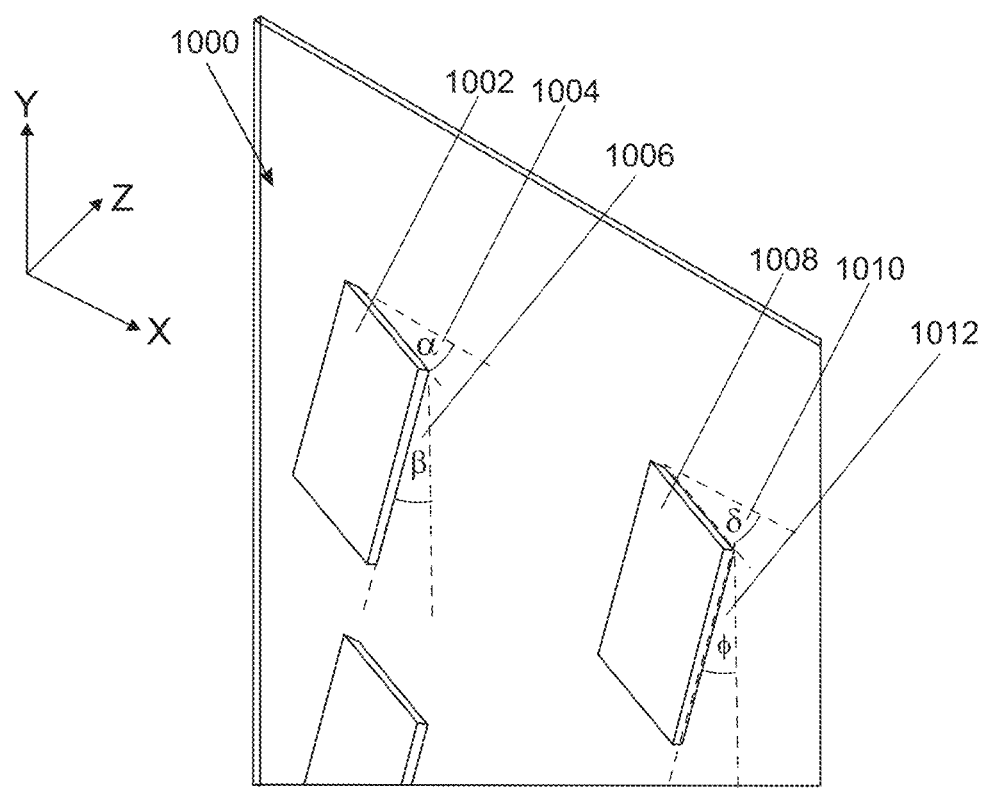
FIG. 10 is a partial view showing reflective elements of the optical combiner tilted at different angles relative to the common plane in which they are disposed according to one embodiment

In some embodiments of the optical combiners described herein, at least some of the reflective elements 108, etc. in the optical substrate are tilted at different angles from one another and/or at least some of the reflective elements are tilted in parallel with one another. Also, in some further embodiments, some of the reflective elements are individually tilted relative to the planes occupied by the reflective elements. By way of example FIG. 10, is a partial view of the optical combiner showing reflective elements (in this case rectangular reflective dots) 1002, 1008 tilted at different angles relative to common plane 1000 in which they are occupied in the optical substrate according to one embodiment. First reflective dot 1002 is tilted in the x axis by a first angle 1004 relative to common plane 1000 whereas second reflective dot 1008 is tilted in the x axis by a second angle 1010 relative to the common plane, the second angle 1010 being different from the first angle 1004. Also, first reflective dot 1002 is tilted in the Z axis by a third angle 1006 relative to common plane 1000 whereas second reflective dot 1008 is titled in the z axis by a fourth angle 1012 relative common plane 1000, the fourth angle 1012 being different from the third angle 1006. In other embodiments, at least some of the reflective elements can be tilted in x, y, z planes (or any combination thereof) differently or in the same way)

The optical combiners of the described embodiments have many advantages over known waveguide reflectors. The optical combiners of embodiments are insensitive to input polarization unlike known combiners that require careful polarization control on transit through the reflectors. The optical combiners of embodiments have inherently broadband optical bandwidth unlike known combiners that require careful design to make sure reflectivity is maintained over a wide range of incidence angles. The optical combiners of embodiments are less complex because patterns of reflective dots or other elements can be fabricated using a single layer of reflective material. In contrast, in known combiners each reflector array will require 20 to 30 separate carefully deposited layers to make one reflecting surface. The optical combiners are easily fabricated and robust compared to known combiners which are difficult to manufacture due to the highly complex multiple layers of reflective films and the fragile nature of the multilayers.

Figure 5:
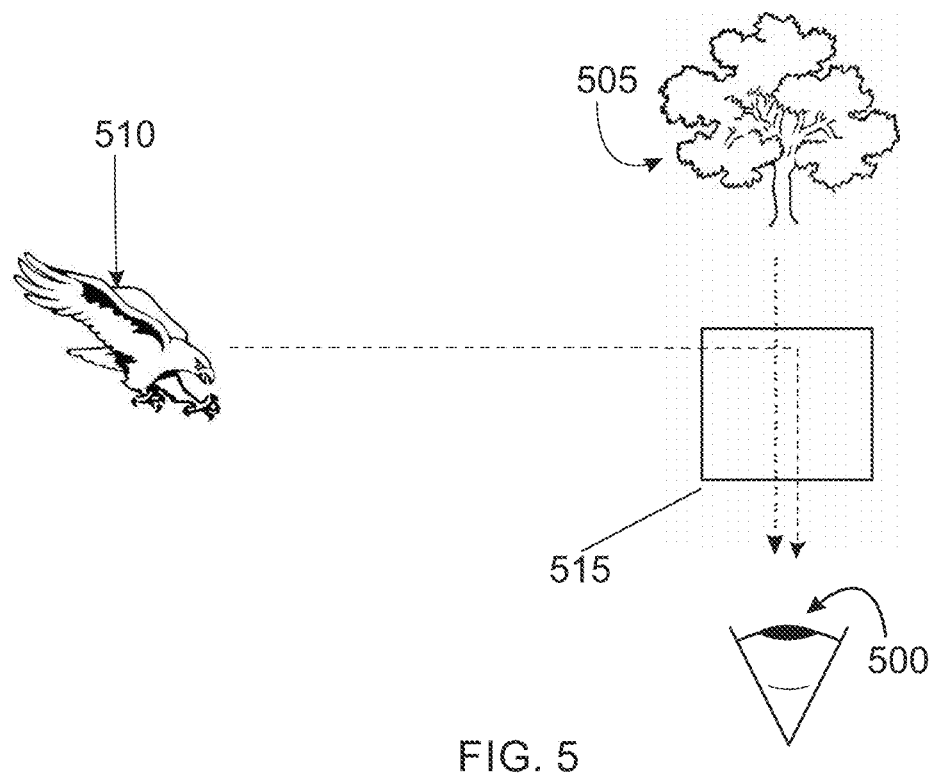
FIG. 5 is a schematic diagram showing generally how an augmented reality image combiner combines images according to one embodiment.

In some aspects, the optical combiners can be used for combining augmented reality images and a real world scenes. As indicated by FIG. 5, an augmented reality image combiner 515 is an optical structure that overlays the real world scene 505 with an optically projected computer generated image 510 and relays the combined image into the eye or eyes 500 of an observer. Optical combiner 515 is any one of the optical combiners described hereinbefore with reference to FIGS. 1-4. The plurality of reflective dots are arranged in such a way that, when the optical combiner is in use, the received computer generated optical image is reflected and superimposed on the real world scene view.

Figure 6:
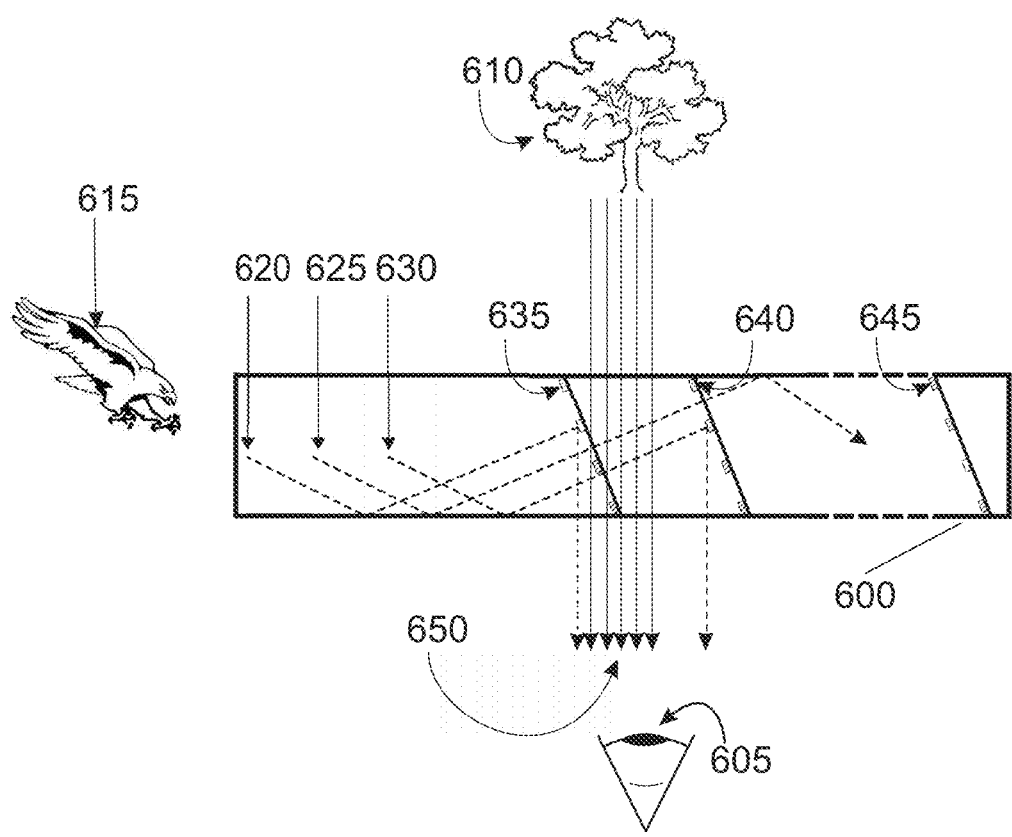
FIG. 6 is a schematic diagram showing in detail how an augmented reality image combiner combines images according to an embodiment.

In order to more adequately illustrate how the images are combined in an augmented reality image combiner, reference is made to FIG. 6 which is a simplified schematic of an augmented reality optical combiner system according to an embodiment. This figure demonstrates how an optically projected computer graphic rays contained within the waveguide are relayed into the observer's eye and how rays from the real world scene pass through. Optical combiner 600 can be any one of the optical combiners described hereinbefore with reference to FIGS. 1-4. However, for ease of explanation FIG. 6 has been greatly simplified to show three spaced apart sparse reflectors and show only four reflective dots on each sparse reflector. By way of example, guided rays 620, 625, 630 originating from a projected image 615 are captured in an optical receiving end of the optical waveguide substrate and are relayed towards the observer's eye 605. In particular, example guided ray 620 originating from the projected image 615 captured in the waveguide is relayed towards the observer's eye 605 off a reflective element formed on sparse area reflector n=1 635. Furthermore, example guided ray 625 originating from the projected image 615 and captured in the waveguide passes through transparent region of sparse area reflector 635 and subsequent transparent region of sparse area reflector n=2 640. Yet furthermore, example guided ray 630 originating from the projected image 615 captured in the waveguide is relayed towards the observer's eye 605 off a reflective element formed on sparse area reflector n=2. Arbiturary bundle of rays 650 originating from the real scene pass through the optical combiner.

Figure 7:
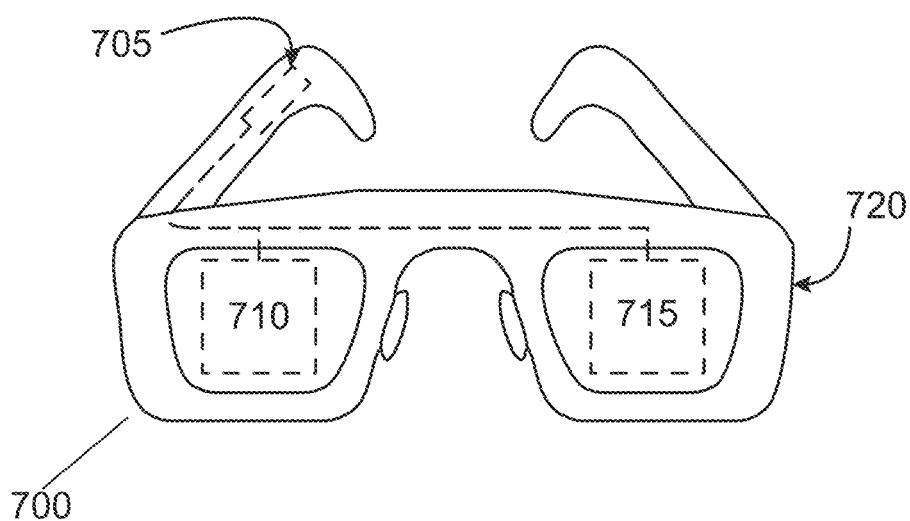
FIG. 7 is a front view of augmented reality head mounted display glasses according to an embodiment.

In some aspects, one or more of the optical combiners are incorporated in head mounted displays. In some embodiments, a pair of the optical combiners are included in glasses or Goggle form factor augmented reality head mounted displays. FIG. 7 shows a front view of a pair of the head mounted display glasses according to one embodiment. Glasses or Goggle type head mounted display 700 has a processing module 705 generating computer formed images for binocular view. A left eye optical combiner and projection system 710 and a right eye optical combiner and projection system 715 are included in the head mounted display. The optical combiner in each system 710, 715 is any one of the optical combiners of the embodiments described herein with or without reference to FIGS. 1-6. Optical image projector 265 and optical coupling 270 for example may form part of the projector system. An opto-mechanical frame 720 holds the optical parts securely and in the correct geometric alignment.

In some embodiments, the formed images are for monocular view and only one of the optical combiner and projection systems 710, 715 is included in the head mounted display.

Figure 8:
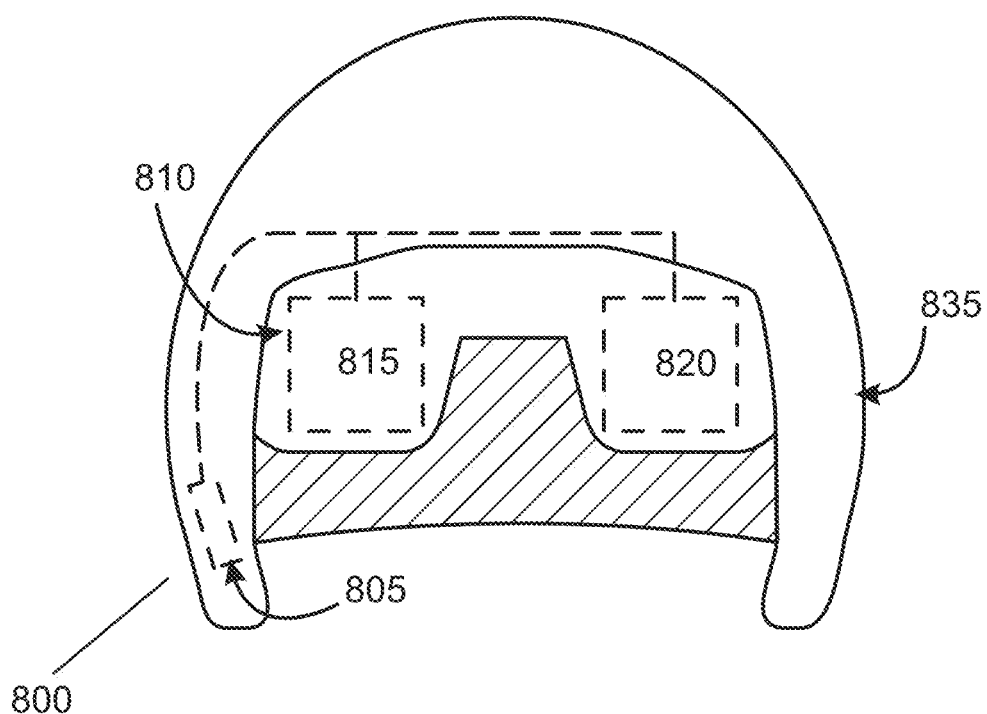
FIG. 8 is a front view of an augmented reality head mounted display helmet according to an embodiment.

In some embodiments, the head mounted display in which one or more of the optical combiners is incorporated is a helmet form factor augmented reality head mounted display. FIG. 8 shows a front view of a head mounted display helmet according to one embodiment. Helmet head mounted display 800 has a processing module 805 generating computer formed images for binocular view. A left eye optical combiner and projection system 815 and a right eye optical combiner and projection system 820 are included in the head mounted display. The optical combiner in each system 815, 820 is any one of the optical combiners of the embodiments described herein with or without reference to FIGS. 1-6. Optical image projector 265 and optical coupling 270 may for example form part of the projector system. An opto-mechanical sub frame 810 holds the optical parts securely and in the correct geometric alignment. Opto-mechanical sub frame 810 is supported by a mechanically robust shell 835 of the helmet.

In some embodiments, the formed images are for monocular view and only one of the optical combiner and projection systems 815, 820 is included in the head mounted display.

It will be appreciated that various of the above-disclosed and other features and functions, or alternatives thereof, may be desirably combined into many other different systems or applications such as head up type displays. Various presently unforeseen or unanticipated alternatives, modifications, variations, or improvements therein may be subsequently made by those skilled in the art which are also intended to be encompassed by the following claims. For example, the head mounted display sets may be visors, goggles or headband structures and are not limited to the particular types shown in the Figures. Likewise the shape of the optical combiner substrates may be any shape that is capable of guiding and combining images in the manner described hereinbefore.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. An augmented reality optical apparatus, comprising:
   a head mounted display; and
   at least one optical combiner supported on the head mounted display, the at least one optical combiner comprising:
   an optically transparent substrate comprising a volume of optically transparent material defined by a front face, a rear face opposite the front face, a first end, a second end opposite the first end, and a wave propagation axis extending along a length of the volume from the first end to the second end;
   optically reflective dots disposed within the volume in a first direction parallel to the wave propagation axis and a second direction perpendicular to the wave propagation axis that reflect optical image rays emitted from the first end or the second end through the front face, wherein the optically reflective dots are inclined relative to the wave propagation axis and spaced apart from one another in the first direction and the second direction; and
   transparent regions disposed between the optically reflective dots extending in the first direction and the second direction.

2. The apparatus of claim 1, wherein the optically reflective dots and the transparent regions disposed between the optically reflective dots are included in a patterned region of the optically transparent substrate, and wherein the patterned region comprises an irregular patterned region.

3. The apparatus of claim 1, wherein the optically reflective dots and the transparent regions disposed between the optically reflective dots are included in a patterned region of the optically transparent substrate, and wherein the patterned region comprises a regular patterned region.

4. The apparatus of claim 1, wherein the transparent regions comprise regions of the optically transparent substrate unoccupied by the optically reflective dots.

5. The apparatus of claim 1, wherein the optically reflective dots are distributed in a plurality of planes spaced apart along the wave propagation axis.

6. The apparatus of claim 5, wherein the optically reflective dots are also distributed in intermediate regions of the optically transparent substrate between respective planes of the plurality of planes.

7. The apparatus of claim 5, wherein the transparent regions comprise first transparent regions disposed between the optically reflective dots within the plurality of planes and wherein an optically reflective substrate further comprises second transparent regions between respective planes of the plurality of planes.

8. The apparatus of claim 1, further comprising:
   an optical image projector supported on the head mounted display that generates the optical image rays, the optical image projector being in optical communication with the optically transparent substrate.

9. The apparatus of claim 1, wherein the optically reflective dots are arranged in at least one regular array.

10. The apparatus of claim 1, wherein the optically reflective dots are fully reflective elements.

11. The apparatus of claim 1, wherein the optically reflective dots respectively comprise a fully or substantially reflective front side and fully or substantially absorbing rear side.

12. The apparatus of claim 1, wherein at least some of the optically reflective dots comprise tilted dots which are tilted parallel to each other.

13. The apparatus of claim 12, wherein the tilted dots are distributed within a same plane.

14. The apparatus of claim 12, wherein the tilted dots are distributed within different planes.

15. The apparatus of claim 12, wherein the tilted dots are distributed throughout the volume of the optically transparent substrate.

16. The apparatus of claim 1, wherein the optically reflective dots comprise groups of dots, the groups of dots being spaced apart along the optically transparent substrate, wherein a first group of the groups is arranged for partially reflecting first optical image rays propagating along the wave propagation axis, and wherein at least one second group of the groups of dots is arranged for reflecting second optical image rays that are not reflected by the first group.

17. The apparatus of claim 1, wherein a size, shape, and spacing of the optically reflective dots varies.

18. The apparatus of claim 1, wherein a size, shape, reflectivity, number or distribution of the optically reflective dots is electronically adjustable to adjust a reflectivity to transmission ratio of the optical combiner.

19. An augmented reality optical apparatus, comprising:
   a head mounted display; and
   an optical combiner supported on the head mounted display, the optical combiner comprising:
   an optically transparent substrate comprising a volume of optically transparent material defined by a front face, a rear face opposite the front face, a first end, a second end opposite the first end, and a wave propagation axis extending along a length of the volume from the first end to the second end; and
   a patterned region included within the volume of the optically transparent substrate;

wherein the patterned region comprises optically transparent regions and optically reflective regions; and wherein the optically reflective regions comprise reflective dots that are distributed throughout a portion of the volume in a first direction parallel to the wave propagation axis and a second direction perpendicular to the wave propagation axis, wherein the reflective dots are inclined at an angle relative to the wave propagation axis and spaced apart from one another in the first direction and the second direction, and wherein the reflective dots reflect rays emitted from the first end or the second end through the front face.

20. The apparatus of claim 19, wherein the patterned region comprises an irregular patterned region.

21. The apparatus of claim 19, wherein the patterned region comprises a regular patterned region.

22. The apparatus of claim 19, wherein the optically transparent regions comprise regions of the optically transparent substrate unoccupied by the reflective dots.

23. The apparatus of claim 19, wherein the reflective dots are distributed in a plurality of planes of the optically transparent substrate and spaced apart along the wave propagation axis.

24. The apparatus of claim 23, wherein the reflective dots are further distributed in intermediate regions of the optically transparent substrate between respective planes of the plurality of planes.

25. The apparatus of claim 19, wherein the reflective dots are inclined at a same angle relative to the wave propagation axis.

26. The apparatus of claim 19, wherein the reflective dots are arranged in at least one regular array.

27. The apparatus of claim 19, wherein the reflective dots comprise fully reflective elements.

28. The apparatus of claim 19, wherein the reflective dots respectively comprise a fully or substantially reflective front side and fully or substantially absorbing rear side.

29. The apparatus of claim 19, wherein the reflective dots comprise two or more tilted reflective dots that are tilted parallel to each other.

30. The optical combiner of claim 29, wherein the two or more tilted reflective dots that are distributed within a same plane.

31. The optical combiner of claim 29, wherein the two or more tilted reflective dots that are distributed within different planes.

32. The apparatus of claim 19, wherein a size, shape, and spacing of the reflective dots varies.

33. The apparatus of claim 19, wherein a size, shape, reflectivity, number or distribution of the reflective dots is electronically adjustable to adjust a reflectivity to transmission ratio of the optical combiner.

* * * * *